No. 877,558. PATENTED JAN. 28, 1908.
H. G. FARR.
SELF LUBRICATING TROLLEY WHEEL.
APPLICATION FILED DEC. 24, 1906.
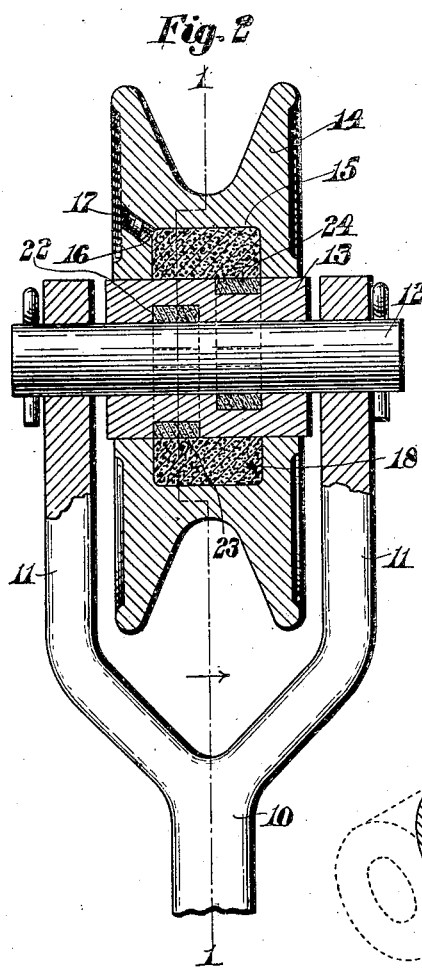
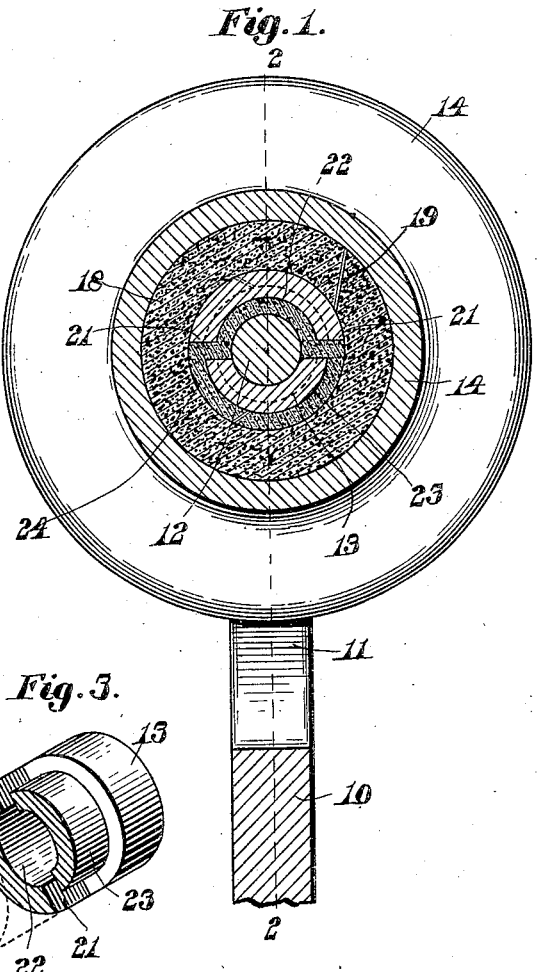
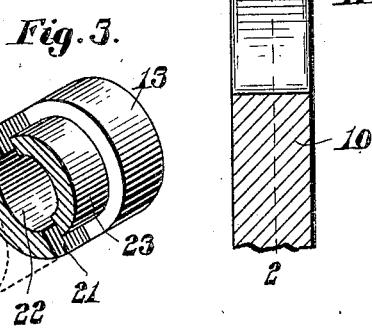
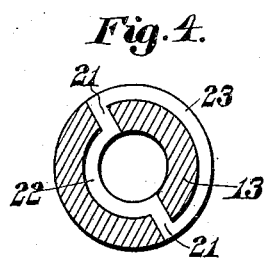
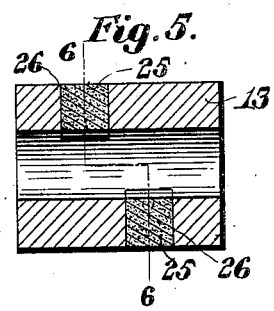
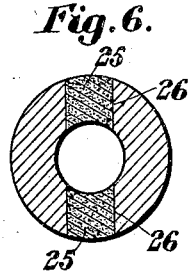
Witnesses:
Nathan C. Lombard
Howard Hanscom
Inventor:
Hiram G. Farr,
by Walter E. Lombard,
Atty.

UNITED STATES PATENT OFFICE.

HIRAM G. FARR, OF MELROSE HIGHLANDS, MASSACHUSETTS.

SELF-LUBRICATING TROLLEY-WHEEL.

No. 877,558.  Specification of Letters Patent.  Patented Jan. 28, 1908.

Application filed December 24, 1906. Serial No. 349,250.

*To all whom it may concern:*

Be it known that I, HIRAM G. FARR, a citizen of the United States of America, and a resident of Melrose Highlands, in the county of Middlesex and State of Massachusetts, have invented certain new and useful Improvements in Self-Lubricating Trolley-Wheels, of which the following is a specification.

This invention relates to self-lubricating bearings for trolley wheels and has for its object the production of a wheel provided with a central chamber wholly filled with an absorbent pad adapted to receive and retain therein a quantity of lubricant, said pad extending to the inner wall of said trolley wheel and being adapted to coöperate with another absorbent pad extending diametrically through the wheel bushing and contacting with the shaft upon which said wheel revolves. By such a construction the lubricant contained within the absorbent pad in the chamber of the wheel gradually passes through the pad in the bushing to lubricate the bearing surfaces of said pin or shaft and bushing and is prevented from passing too freely to the bearing surfaces.

The invention consists in certain novel features of construction and arrangement of parts which will be readily understood by reference to the description of the drawings and to the claims hereinafter given.

Of the drawings: Figure 1 represents a section of a trolley wheel embodying the features of this invention, the wheel being shown applied to the usual harp and supporting shaft. Fig. 2 represents a transverse section of said wheel the cutting plane being on line 2—2 on Fig. 1. Fig. 3 represents a perspective sectional view of the wheel bushing. Fig. 4 represents a transverse section through the same, and Figs. 5 and 6 represent sections of a modified form of bushing.

Similar characters designate like parts throughout the several figures of the drawings.

In the drawings, 10 represents the harp of ordinary form having mounted in its forked ends 11 a shaft or pin 12 prevented from rotating therein in any well-known manner. Between the forked ends 11 of the harp 10 is a revoluble bushing 13 the outer diameter of which nicely fits the bore of the trolley wheel 14 into which it is driven to cause the wheel and bushing to revolve together. The wheel 14 is provided with an internal chamber 15 with which communicates a passage 16 provided with a threaded plug 17 which may be removed for the insertion of the lubricant into said chamber 15.

Within the chamber 15 is mounted an absorbent pad 18 of felt or similar material the ends of which are cut off diagonally as indicated at 19 and overlap one another. The interior wall of said pad 18 before the insertion of the bushing extends slightly beyond the interior wall of the wheel 14 and is forced outwardly by the insertion of the bushing 13 to insure its close contact at all times with the periphery of said bushing.

The bushing 13 is provided with diametral openings 21 extending through the same, these openings communicating with depressions 22 and 23 respectively upon the inner and outer walls of said bushing. The two sets of openings and depressions are diametrically opposed to one another as clearly shown in Figs. 1 and 2 and in each of the depressions 22 is inserted an absorbent strip or wick 24 of felt or other material, the ends of which pass through the openings 21 through the bushing and are extended into the depression 23 where the ends abut one another. Before the insertion of the bushing into the bore of the trolley wheel the absorbent strip or pad 24 extends slightly beyond the periphery of the bushing 13 so that when said bushing is inserted in position the outer surface of the pad 24 will be insured positive contact with the inner face of the absorbent pad 18.

When the absorbent pad 18 is thoroughly saturated with the lubricant with which it is desired to lubricate the bearing contained therein said lubricant will be drawn by the heat generated in the revolution of the trolley wheel upon said pin 12 through the absorbent strip or pad 24 where it will be transferred to the bearing surfaces of said pin and bushing.

By such a construction as this the lubricating grease or oil with which the absorbent pad is saturated is prevented from being wasted by feeding to the bearing surfaces too rapidly, while at the same time a sufficient quantity of the grease or oil or other lubricant with which the pad is saturated will be drawn through the absorbent strip 24 to provide enough lubricant to cause the proper operation of said wheel.

The bushing 13 is of less length than the space between the inner faces of the forked arms 11 of the harp 10 so that the wheel is permitted to have an end movement upon the journal or shaft 12 thus allowing the trolley to more readily follow the trolley wire and prevent it from jumping therefrom. This movement will cause the absorbent pad 24 to move along the journal or shaft 12 and transfer the lubricant lengthwise thereof. As will be seen by this construction the interior bore of the bushing has a convenient bearing surface upon the journal or shaft 12 while at the same time the strip of absorbent material feeding the lubricant thereto is so embedded in the depressions 22 on the interior face of the bushing 13 that a considerable extent of surface of said pad is at all times bearing upon the bearing surfaces of the shaft or journal 12 thus insuring that a sufficient quantity of lubricant will always be transferred to said surfaces.

Figs. 5 and 6 represent modified forms of the bushing in which the absorbent pads 25 extend through the diametral slots 26 but do not extend into any depressions 22 and 23 as in the preferred form, the area of the outer and inner surfaces of said pads 25 being sufficient to transfer sufficient lubricant through the same to the bearing surfaces.

It is believed that from the foregoing the operation of the invention and its advantages will be fully apparent.

Having thus described my invention, I claim:

1. In a self-oiling bearing for trolley wheels, the combination of a chambered wheel; an absorbent packing in said chamber; a bushing for said wheel provided with openings therethrough and depressions in the outer and inner faces thereof adjoining said openings; and an absorbent member extending through said openings and resting in said depressions.

2. In a self-lubricating bearing for trolley wheels, the combination of a trolley wheel having a central bore extending therethrough and provided with a lubricating chamber communicating with said bore; a bushing adapted to be driven into and fitting said bore and provided with radial openings therethrough connecting with a circumferential depression in its periphery; and percolating members in said openings and depression adapted to contact with the supporting pin.

3. In a self-lubricating bearing for trolley wheels, the combination of a trolley wheel provided with a lubricating chamber communicating with its bore; a bushing fitting said bore and provided with radial openings therethrough connecting with a depression in its inner wall; and absorbent members in said openings and depression adapted to contact with the supporting pin.

4. In a self-lubricating bearing for trolley wheels, the combination of a trolley wheel having a central bore therethrough and provided with an annular chamber communicating therewith; a bushing fitting said bore and wholly confined therein provided with radial openings extending therethrough and a peripheral depression communicating with and connecting two of said openings; a felt pad in said annular groove extending to the walls of said central bore; and a strip of percolating material extending through each of said openings and resting in said depressions with its outer face corresponding to the periphery of said bushing.

Signed by me at Boston, Mass., this 19th day of December, 1906.

HIRAM G. FARR.

Witnesses:
   WALTER E. LOMBARD,
   EDNA C. CLEVELAND.